United States Patent [19]

Jiao

[11] Patent Number: 5,390,265
[45] Date of Patent: Feb. 14, 1995

[54] FIBER OPTIC LIGHT COUPLER

[75] Inventor: Jianzhong Jiao, Troy, Mich.

[73] Assignee: General Motors Corporation, Detroit, Mich.

[21] Appl. No.: 168,258

[22] Filed: Dec. 17, 1993

[51] Int. Cl.6 .............................................. G02B 6/26
[52] U.S. Cl. .................................... 385/15; 385/89; 385/92
[58] Field of Search ................ 385/89, 91, 15, 33, 385/88, 92, 93, 115, 116, 119, 146, 901; 362/32

[56] References Cited

U.S. PATENT DOCUMENTS

| | | | |
|---|---|---|---|
| 2,297,851 | 10/1942 | Wyss | 385/901 |
| 3,564,231 | 2/1971 | Bruce | 385/115 |
| 3,749,901 | 7/1973 | Clough | 385/115 |
| 4,747,030 | 5/1988 | Offner et al. | 362/302 |
| 4,755,918 | 7/1988 | Pristash et al. | 362/301 |
| 4,868,718 | 9/1989 | Davenport et al. | 362/32 |
| 4,912,605 | 3/1990 | Whitehead | 362/32 |
| 4,930,049 | 5/1990 | Davenport et al. | 362/32 |
| 4,933,813 | 6/1990 | Berger | 362/2 |
| 4,947,293 | 8/1990 | Johnson et al. | 362/32 |
| 4,949,227 | 8/1990 | Finch et al. | 362/61 |
| 5,117,312 | 5/1992 | Dolan | 385/901 |
| 5,184,883 | 2/1993 | Finch et al. | 362/32 |
| 5,222,793 | 6/1993 | Davenport et al. | 362/32 |
| 5,243,410 | 9/1993 | Larson et al. | 356/236 |

Primary Examiner—Rodney B. Bovernick
Assistant Examiner—John Ngo
Attorney, Agent, or Firm—Ernest E. Helms

[57] ABSTRACT

An optical coupler is provided which includes a light source; a conduit spaced from the light source with a major axis intersecting the light source, the conduit having a circular opening for receiving light from the light source; a first reflector surface of a partial rotated ellipse positioned to place the light source at the focus of the ellipse, the first surface having an extreme end with a first angle between the focus of the ellipse and the extreme end; and a second reflector surface juxtaposed between the first reflector surface and the conduit, the second reflector surface being generated from a compound parabola with a focus along the circular opening of the conduit with a parabolic axis at an angle generally equal to the first angle from the major axis of the cable rotated along the major axis of the cable.

9 Claims, 1 Drawing Sheet

FIBER OPTIC LIGHT COUPLER

FIELD OF THE INVENTION

The field of the present invention is that of optical coupling arrangements for taking light from a light source and directing it into a tubular conduit and methods of utilization thereof. More particularly, the field of the present invention is that of using high intensity discharge bulbs as light sources to generate a plurality of lighting outlets.

BACKGROUND OF THE INVENTION

To eliminate the plurality of bulbs in an automobile, it is desirable to provide a central lighting system using one high lumen output light source which provides the light needed for the vehicle through a fiber optic network to operate the various vehicle lamps. One of the key elements for making a central lighting system feasible is to build a high efficiency light collecting device. To effectively couple the light from a small light source [such as a high intensity discharge (HID) bulb] into an optical fiber bundle, it is preferred that the light be converged to a very small focal spot size and a small converging angle in which the fiber optic cable is located. In general, the larger the focal spot size provided, the smaller is the converging angle that can be achieved. However, the larger the cable diameter, the more difficult it is to route the cable through the vehicle. Therefore, small diameter cables are preferable. However, very small diameter cables require much larger converging angles which lead to a high cost of fibers. Therefore, it is desirable to provide a high efficiency light collecting arrangement with relatively small acceptance angles and small opening apertures so that inexpensive small cable sizes can be utilized.

SUMMARY OF THE INVENTION

To meet the above-noted needs, the present invention is brought forth. The present invention uses an HID light source that is assumed to emit light in a close to spherical symmetry manner. The first reflector surface is positioned to place the light source at the focus of the rotated ellipse. The first reflector surface has an extreme end which is at a first angle with the loci of the ellipse. In the preferred embodiment, continuous with the first reflector surface is a second reflector surface generated from a compound parabola. The compound parabola has a focus along the circumference of the opening of the fiber optic cable and is oriented along a parabolic axis at the first previously mentioned angle. Additionally, the parabola is then rotated along a major axis of the fiber optic cable. Therefore, light hitting the second reflector surface at the interference between the first and second reflector surfaces will tend, in the worst case scenario, to be reflected to an edge of the opening of the fiber optic cable at an angle no greater than the first previously mentioned predetermined first angle. A much greater percentage of the total light generated by the high intensity bulb is collected into the cable than was previously collected by prior coupler designs.

Further advantages will be apparent to those familiar with the art after review of the invention provided in the accompanying drawings and detailed description.

DESCRIPTION OF THE PREFERRED EMBODIMENTS

Figure 1:
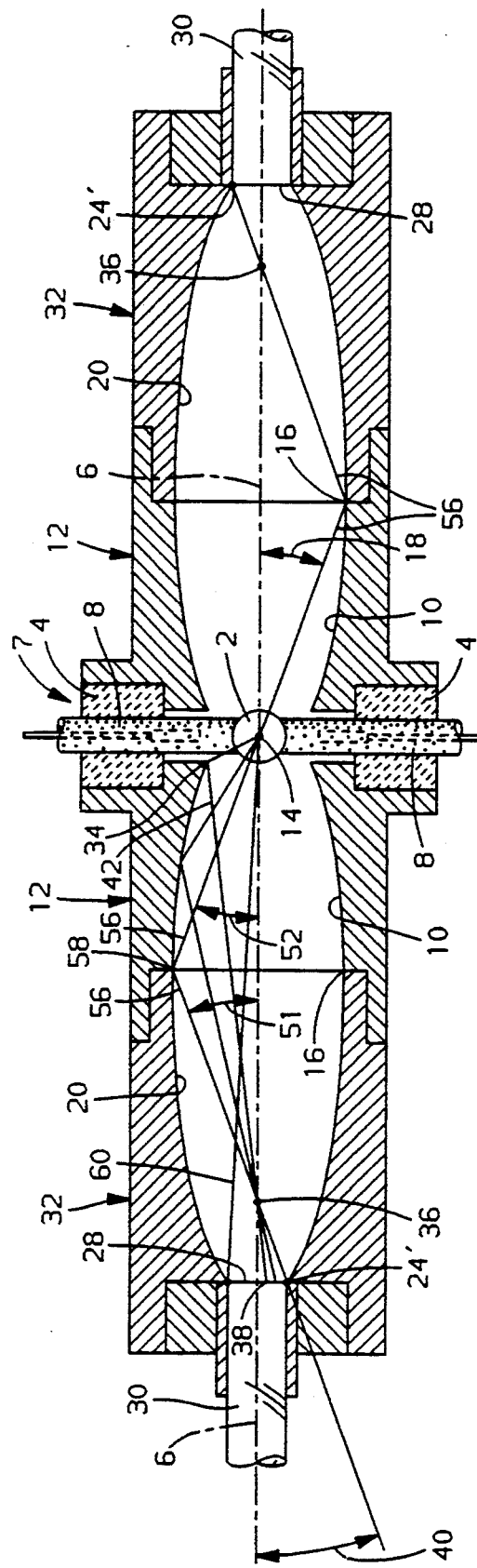
FIG. 1 is a sectional view of the preferred embodiment optical coupler arrangement according to the present invention.

Referring to FIG. 1, the optical coupler arrangement 7 of the present invention has a light source provided by a high intensity discharge bulb 2. The high intensity discharge bulb typically generates in the neighborhood of 2400 lumen at 30 watts. The ends of the high intensity discharge bulb 2 are held by two insulating ceramic rings 4. The bulb 2 is made in such a manner that the highest light intensity output is along an axis 6 which is perpendicular to its two connective stems 8.

Adjacent the bulb 2 are two geometrically-spaced, axially aligned first reflector surfaces 10. The first reflector surfaces 10 are machined out of two separate cylinders 12. The first reflector surface 10 is elliptical and has a focus 14 located at the center of the bulb 2. This elliptical surface 10 is rotated about the major axis 6 of fiber optic cables 30. Each first reflector surface 10 has an extreme end 16. A line drawn from the extreme end 16 to the focus 14 generates a first predetermined angle 18 which in the embodiment shown is 20 degrees. (The angle 18 is chosen to meet the smaller acceptance angle needed for a fiber optic cable. However, the angle 18 is typically chosen to be smaller than the maximum acceptance angle for the fiber optic cable.)

Figure 2:
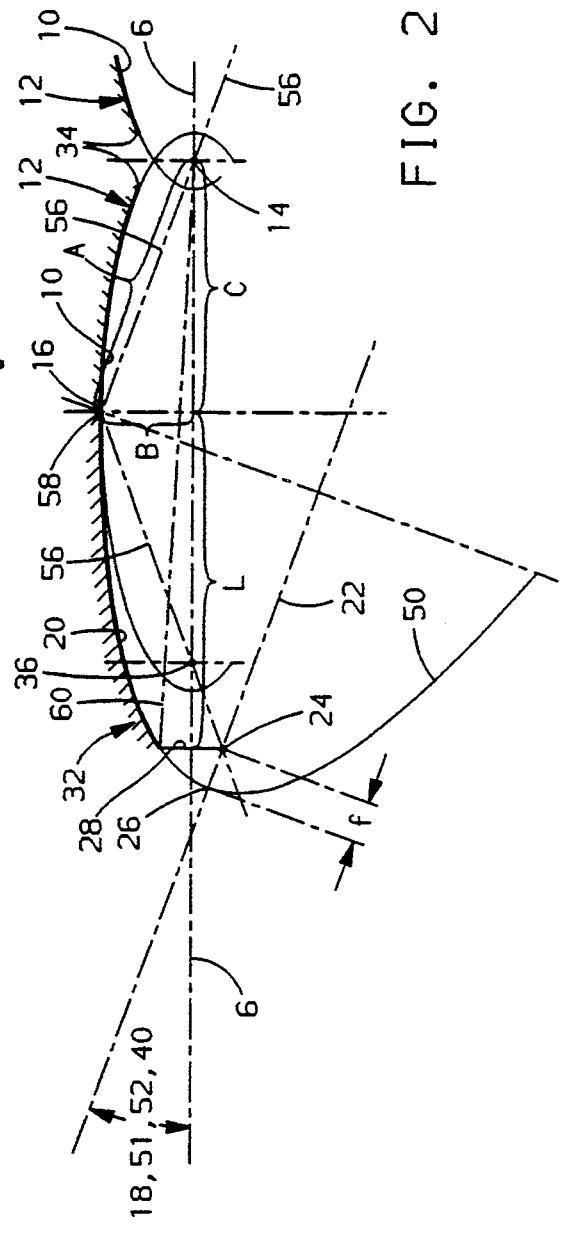
FIG. 2 is a view illustrating the geometric relationship of the various portions of the coupler arrangement.

Continuous with the first reflector surface 10 is a second reflector surface 20. The second reflector surface 20 is generated from a compound parabola 50 having an axis 22 as seen in FIG. 2. The parabola 50 has a focus 24 with a vertex 26. The parabola 50 is then rotated about axes 6 and 22, thereby generating a compound parabolic surface 20 which has an annular foci 24' along an edge of opening 28 of the fiber optic cable 30. The second reflector surface 20 is also generated out of a cylinder 32 which is mechanically joined to the cylinder 12. Both reflector surfaces 10 and 20 can be made of metal, glass or other suitable materials with high surface reflectivities.

The operation of the optical coupler 7 is as follows. Light ray 42 (the largest emitting angle from the HID light source being collected) hitting the inner tip 34 of the first reflector surface causes it to be reflected toward the more distant elliptical foci 36 of the first reflector surface 10 and therefore go into the fiber optic cable at a point within the opening 28 of the fiber optic cable 30 above the edge of the fiber optic cable (annular parabolic foci 24'). A ray 56 that hits the very end of the first reflector surface 10 and the very beginning of the second reflector surface 20 (interface 58) (the last ray being collected by the first reflector surface 10 and the first ray being collected by the second reflector surface 20) will also pass through the other elliptical foci 36 and will hit upon the annular parabolic foci 24'. Since the ray 56 passes through both elliptical foci 14 and 36, the angle 18 must be equal to angles 52, 51 which are equal to angle 40, which is the angle of incidence of the ray 56 into the fiber optic cable.

Light ray 60, which is the last ray to hit the second reflector surface 20, will be the first ray directly entering the fiber optic cable 30. All the rays between the ray 56 and ray 60 will be reflected by the second reflector surface 20 into the fiber optic cable 30 with an angle of incidence greater than angle 40 (20 degrees). Therefore, it is important to design the second reflector surface 20 to achieve more area to reflect light in the angles equal to or smaller than the (maximum) acceptance angle of the fiber optic cable 30. Accordingly, it is preferred that the angle of incidence of the rays between rays 56 and 60 on the second reflector surface not exceed 30 degrees.

In a typical example where an eight millimeter diameter cable was utilized, the equation which generates the first reflector surface is $X/A^2 + 2/B^2 = 1$ where $A = 34.19$ mm; $B = 11.70$ mm; $C = \sqrt{A^2 - B^2} = 32.13 =$ the distance along axis 6 from interface 58 to parabolic foci $28 = 43.12$ mm; and $f =$ the parabolic focal length $= 5.37$ mm. (Using the example parameters, the total collecting efficiency is more than 80 percent for the fiber optic cable with 30 degree acceptance angle.)

While this invention has been described in terms of a preferred embodiment thereof, it will be appreciated that other forms could readily be adapted by one skilled in the art. Accordingly, the scope of this invention is to be considered limited only by the following claims.

The embodiments of the invention in which an exclusive property or privilege is claimed are defined as follows:

1. An optical coupler arrangement comprising:
   a light source;
   a conduit spaced from the light source with a major axis intersecting the light source, the conduit having a circular opening for receiving light from the light source;
   a first reflector surface of a partial rotated ellipse, the first reflector surface being positioned to place the light source at the focus of the ellipse, the first surface having an extreme end with a first angle between the focus of the ellipse and the extreme end; and
   a second reflector surface juxtaposed between the first reflector surface and the conduit, the second reflector surface being generated from a compound parabola with a focus along the circular opening of the conduit with a parabolic axis projecting at an angle generally equal in measure to the first angle from the major axis of the conduit, the parabolic axis being rotated about the major axis of the conduit.

2. An optical coupler arrangement as described in claim 1 wherein the conduit is a fiber optic cable.

3. An optical coupler arrangement as described in claim 1 wherein there is a plurality of first and second reflector surfaces, the first surfaces sharing a common focus.

4. An optical coupler arrangement as described in claim 1 wherein the first angle is 20 degrees or less.

5. An optical coupler arrangement as described in claim 4 wherein an angle of incidence of a light collected by the first collector surface is 20 degrees or less and an angle of incidence of a light collected .by the second reflector surface is 30 degrees or less.

6. An optical coupler arrangement as described in claim 1 wherein the light source is a high intensity discharge bulb.

7. An optical coupler arrangement as described in claim 1 wherein the first and second reflector surfaces are continuous with one another.

8. A fiber optical coupler arrangement comprising:
   a light source;
   first and second fiber optic cables spaced from the light source with major axes intersecting with the light source, each cable having a circular opening for receiving light from the light source;
   adjacent first reflector surfaces of partial rotated ellipses, both of the first reflector surfaces being positioned to place the light source at the joint elliptical focus of the ellipses, each first reflector surface having an extreme end and a line drawn from the extreme end of either first reflector surface to the joint elliptical focus forms an angle with each respective cable major axis equal to a first angle; and
   second reflector surfaces continuous with the first reflector surfaces juxtaposed between the first reflector surfaces and the fiber optic cable, each respective second reflector surface being generated from a compound parabola with a focus about the circular opening of the respective fiber optic cable with a parabolic axis projecting at an angle with the respective major axis generally equal in measure with the first angle, the respective parabolic axis being rotated about the respective major axis of the respective cable.

9. A method of collecting light from a light source into a conduit with a circular opening and a major axis comprising:
   generating light from a light source;
   reflecting the light from the light source on a first reflector surface of a partial rotated ellipse, the first reflector surface being positioned to place the light source at the focus of the first reflector surface and to place an extreme end of the first reflector surface distanced away from the light source at a first angle between the focus of the ellipse and the extreme end with respect to the major axis of the conduit; and
   reflecting the light from the light source on a second reflector surface generated from a compound parabola with a focus along the circular opening of the conduit having a parabolic axis at an angle from the major axis generally equal in measure to the first angle, the parabolic axis being rotated about the axis of the conduit.

* * * * *